United States Patent

[11] 3,553,505

[72] Inventor Suguru Sato
 Shataku, Japan
[21] Appl. No. 811,323
[22] Filed Mar. 28, 1969
[45] Patented Jan. 5, 1971
[73] Assignee Nippon Denso Kabushiki Kaisha
 Aichi Ken, Kariya Shi, Showa Cho chome Banchi, Japan

[54] RECTIFIER DEVICE FOR ALTERNATING CURRENT LIGHTING GENERATOR
 6 Claims, 6 Drawing Figs.
[52] U.S. Cl. .................................................. 310/68
[51] Int. Cl. ...................................................... H02k 11/00
[50] Field of Search ........................................... 310/68, 68.4, 168

[56] References Cited
UNITED STATES PATENTS

| | | | |
|---|---|---|---|
| 3,160,771 | 12/1964 | Martin et al. ................. | 310/68 |
| 3,198,972 | 8/1965 | Larson ......................... | 310/68 |

FOREIGN PATENTS

| | | | |
|---|---|---|---|
| 1,168,552 | 4/1964 | Germany...................... | 310/68.4 |

Primary Examiner—D. F. Duggan
Attorney—Michael S. Striker

ABSTRACT: A rectifier device for an alternating current lighting generator for motor vehicles in which a carrier for carrying and cooling diodes of the device are arranged in a bearing shield of the generator and in which the carrier is formed from sheet metal strips provided with a plurality of cutouts extending uniformly spaced from each other and transversely to the longitudinal direction of the strip and then bent into a fan-shaped polygonal configuration, whereby the carrier may be produced with a minimum of scrap while having improved rigidity and heat dissipation.

PATENTED JAN 5 1971

INVENTOR
Suguru SATO
BY
Michael S. Striker
his ATTORNEY

INVENTOR
Suguru SATO
BY
his ATTORNEY 3,553,505

RECTIFIER DEVICE FOR ALTERNATING CURRENT LIGHTING GENERATOR

BACKGROUND OF THE INVENTION

The present invention relates to rectifier devices for alternating current lighting generators for motor vehicles.

Devices of this type are known in the art in which semiconductor rectifier elements, for instance silicon diodes are carried on arc-shaped sheet metal provided at the inner and outer edges thereof with flanges extending normal to the plane of the remainder of the sheet. The curved configuration of the sheet metal strip is necessary in order to arrange the carrier strip sheet in the interior of a bearing shield of the generator about the shaft of the latter, and the flanges provided on the sheet metal strip will increase the surface thereof to thus improve its heat transmission without increasing essentially the space requirements for the carrier, and in addition these flanges will properly stiffen the curved sheet metal strips.

These known carriers are punched out in the curved form from large sheet metal pieces or sufficiently wide sheet metal strips and the flanges thereon are subsequently formed by a drawing operation. This manner of producing the carrier will result in a relatively great amount of scrap which will considerably increase the cost of its production, especially when the large sheet metal plates or the wide sheet metal strips from which the curved carriers are formed are more expensive than for instance narrow sheet metal strips. In addition, the rigidity and the heat dissipating surface of the carriers thus obtained are often insufficient.

SUMMARY OF THE INVENTION

It is an object of the present invention to provide for a rectifier device of the aforementioned kind in which the carrying and cooling members of the device are constructed in such a manner so that they may be produced with a minimum of scrap and in which these members have a rigidity and cooling surface to satisfy the increased demands made on such carriers in this respect.

With these objects in view, the rectifier device according to the present invention mainly comprises semiconductor rectifying elements and carrier means for carrying and cooling these elements and comprising sheet metal strips, each provided with a plurality of cutouts extending uniformly spaced from each other and transverse to the longitudinal direction of the strip and the latter is bent into a fan-shaped polygonal configuration so that the strip may be arranged within the bearing shield of the generator.

The novel features which are considered as characteristic for the invention are set forth in particular in the appended claims. The invention itself, however, both as to its constructions and its method of operation, together with additional objects and advantages thereof, will be best understood from the following description of specific embodiments when read in connection with the accompanying drawing.

DESCRIPTION OF THE PREFERRED EMBODIMENTS

Figure 1:
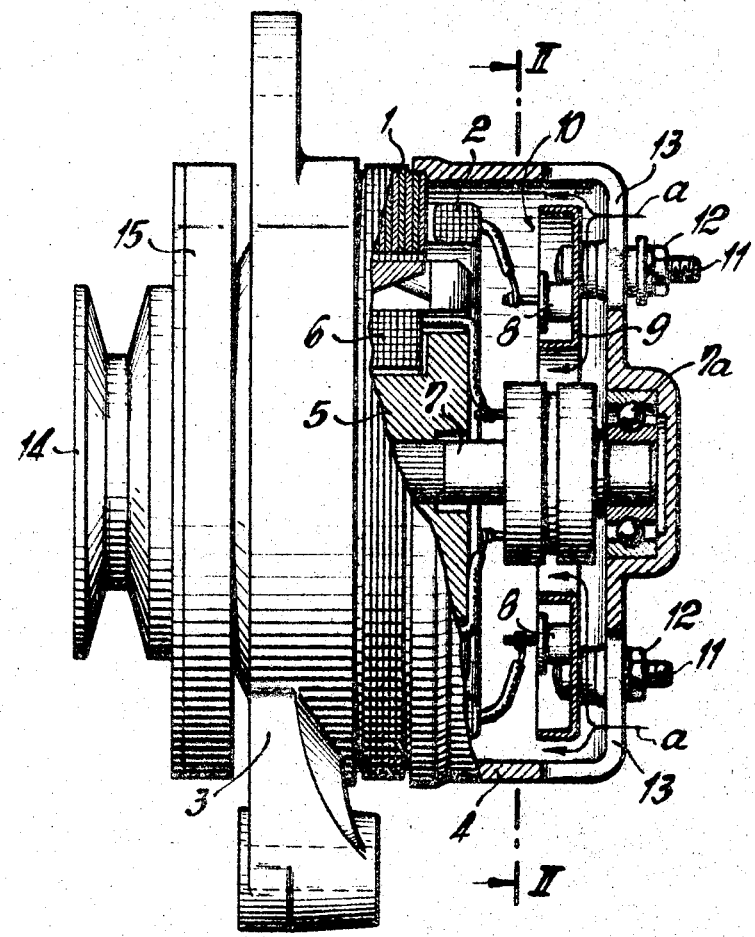
FIG. 1 is a partially sectioned side view of a lighting generator according to the prior art.
Figure 2:
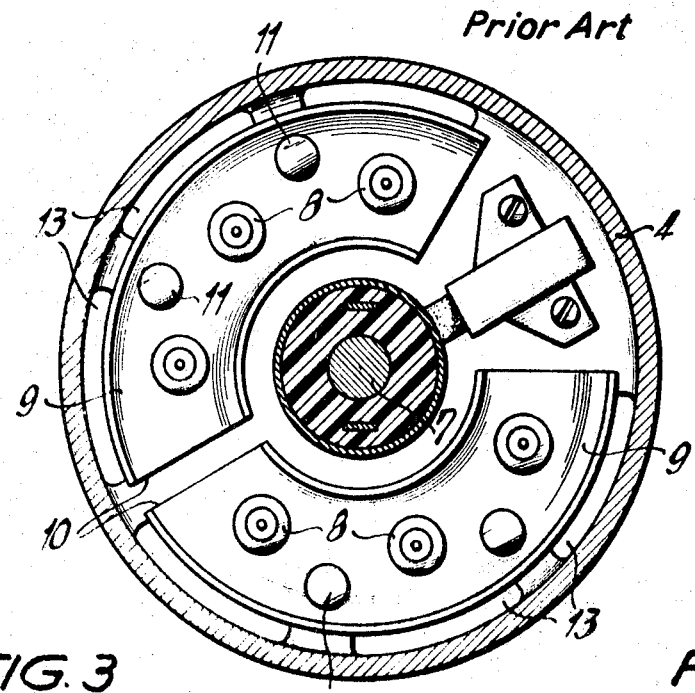
FIG. 2 is a cross section taken along the line II–II of FIG. 1.
Figure 3:
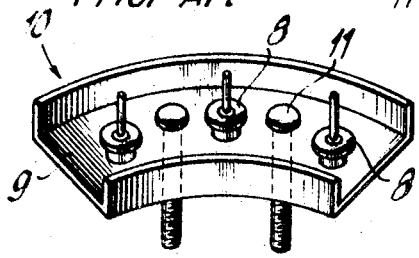
FIG. 3 is a perspective view of carrier means according to the prior art with rectifier elements arranged thereon.

FIGS. 1 and 2 illustrate an alternating current lighting generator according to the prior art which comprises a plurality of superimposed stator laminations 1 carrying the stator winding 2 and being clamped between the bearing shield 3, located at the driven end of the generator, and the bearing shield 4, located at the side of the generator at which the slip rings are provided, by screws, not shown in the drawing. A rotor 5, the poles of which carry a winding 6, is arranged coaxially in the interior of the stator 1, separated therefrom by a annular air gap, and the rotor 5 is mounted with a press-fit on a shaft 7 for rotation therewith. The shaft 7 is by means of ball bearings 7a, only one of which is shown in FIG. 1, journaled in the bearing shields 3 and 4. The shaft 7 projects through a bore in the bearing shield 3 outwardly of the latter and carries at its outer portion a drive pulley 14 and a ventillating fan 15. The fan 15 sucks heated air through openings in the bearing shield 3 from the interior of the generator and, due to the thus-produced underpressure in the interior of the generator, cool air from the surrounding atmosphere will flow in the direction as indicated by the arrows $a$ through opening 13 in the bearing shield 4 into the interior of the generator. A rectifier device 10 is arranged in the interior of the bearing shield 4 and in the path of the cool air streams. This rectifier device comprises carrier and cooling means in form of sheet metal members 9 to which silicon diodes 8 are connected by soldering, and which are connected in circuit with the stator winding 2. The cooling sheets 9 are connected to the bearing shield 4 by means of screws 11 and nuts 12. Each of the cooling sheets has a U-shaped cross section and an arc-shaped configuration, as best shown in FIGS. 2 and 3, and the diodes 8 are arranged at the open side of the U-facing away from the direction of the cool air streams.

Figure 4:
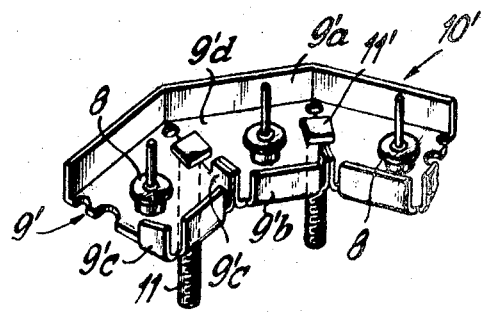
FIG. 4 is a perspective view of carrier means according to the present with rectifier elements arranged thereon.

A rectifier device 10' according to the present invention is illustrated in a perspective view in FIG. 4.

It is to be understood that a pair of such rectifier devices, as shown in FIG. 4, are arranged and connected to the bearing shield 4 of an alternating current lighting generator as described in connection with FIGS. 1 and 2.

Each of the rectifier devices 10' comprises a sheet metal member 9', the diodes 8 soldered thereto, and connecting means in form of screws 11'. The sheet metal member 9' is formed from a relatively narrow sheet metal strip 16, as shown in FIG. 5, into which substantially doll-shaped or wedge-shaped cutouts 17 are punched equally spaced from each other in the longitudinal direction of the strip and extending transverse to the longitudinal direction from one towards but short of the other edge of the strip.

In order to form the sheet metal strip 16 into the configuration as shown in FIG. 4, a plurality of short cuts respectively arranged in the plane of symmetry of each cutout 17 are made extending from the other edge of the strip towards but short of the respective cutout, as indicated by the dash-dotted line $b$, and then, opposite edge portions of the strip are bent normal to the plane of the strip along bend lines indicated by the dash-dotted lines $c$ and $d$ which are equally spaced from and parallel to the longitudinal edges of the strip, to form upwardly extending flanges 9'$a$ and 9'$b$, as shown in FIG. 4, so that the strip will have a U-shaped cross section. Each of the cutouts 17 is formed in such a manner so as to provide in the region of the flanges 9'$b$ a pair of wings $w$, and these wings are bent along the bend lines $e$ substantially normal to the base of the U-shaped strip to the form 9'$c$ as shown in FIG. 4. Subsequently, thereto, the thus-formed U-shaped strip with the wings thereon is bent about an axis normal to the base of the U-shaped strip into a configuration of a fanlike polygonal strip as shown in FIG. 4. The sections of the polygonal strip are formed by trapezoidal base portions 9'$d$ and the flange portions 9'$a$ and 9'$d$, as well as the wing portions 9'$c$ extending normal to the base portions and thereby increasing the rigidity of the strip as well as its heat dissipating surface. The cutouts 17 and the bend lines $e$ of the wing portions are arranged in such a manner that, during bending of the strip 16 to the polygonal configuration as shown in FIG. 4, opposite edges of each cutout and the upwardly bent wing portions will abut against each other to leave only substantially circular openings 17a which serve to receive holding screws 11' and small circular openings 17b serving to reduce the tension in the sheet metal strip occuring during bending of the same into the polygonal configuration. The upwardly bent wing portions 9'c which abut against each other are connected to each other, preferably by welding to thus maintain the cooling sheet 9' in its polygonal configuration.

Figures 5, 6:
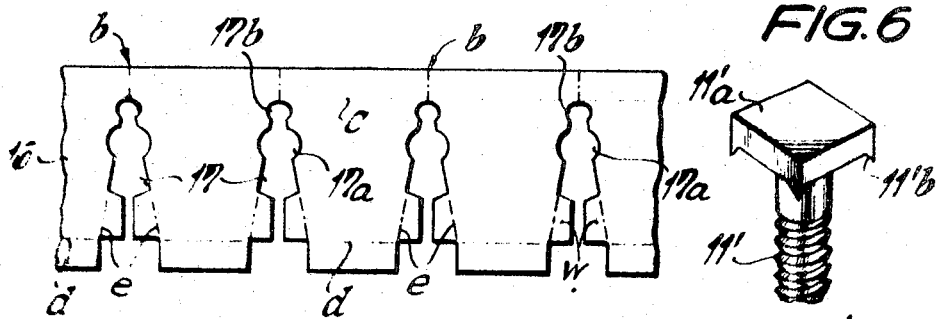
FIG. 5 is a plan view of a punched sheet metal strip from which the carrier means shown in FIG. 4 is to be formed.
FIG. 6 is a perspective view, drawn to an enlarged scale, of connecting means, shown also in FIG. 4, for connecting the carrier means according to the present invention to a bearing shield of a generator.

Each of the fastening screws 11' has, as shown in FIG. 6, a cylindrical stem provided with a screw thread and a preferably rectangular head 11'a provided at each of its corners with a projection 11'b extending in the direction of the stem. The fastening screws 11' are inserted through the round openings 17a, whereby the projections 11'b abut in pairs on adjacent trapezoidal base portions 9'd of the strip. The projections are preferably welded to the base portions whereby the stiffness of the carrier strip is further increased.

The diodes 8 are connected in a known manner to the trapezoidal base portions 9'd of the sections of the carrier strip.

S The carrier means or carrying and cooling sheets of the rectifying device according to the present invention can be made from narrow metal sheet strips while providing a perfect rigidity and increased heat dissipating surfaces. Furthermore, the carrier means according to the present invention may be produced with a minimum of scrap so that they may be manufactured at considerably smaller cost than the above-described bow-shaped carrier strips according to the prior art. Since the portions of the original flat strip are bent only about straight bend lines, the carrier may be formed in a simple and efficient manner reducing thereby the number of rejects obtained during mass production thereof.

The carrier means or cooling sheets, respectively, the rectifier devices according to the present invention, may therefore be produced at a smaller cost than the known bow-shaped carrier strips according to the prior art while the carrier means according to the present invention will provide for a greater rigidity and larger heat dissipating surfaces than the known bow-shaped carrier means.

It will be understood that each of the elements described above, or two or more together, may also find a useful application in other types of rectifier devices differing from the types described above.

While the invention has been illustrated and described as embodied in a rectifier device for an alternating current lighting generator for motor vehicles, it is not intended to be limited to the details shown, since various modifications and structural changes may be made without departing in any way from the spirit of the present invention.

Thus for instance the welding of the projections 11'd on the screwheads to the trapezoidal base portions of the carrier means may be omitted. The screwheads 11'a may also have a different configuration than shown in FIG. 6 and the cutouts 17 in the sheet metal strips 16 may also be formed with a configuration different from that shown in FIG. 5.

What is claimed as new and desired to be protected by Letters Patent is set forth in the appended claims.

I claim:

1. In an alternating current lighting generator for motor vehicles, in combination, a pair of bearing shields for said generator; a rectifier device arranged in one of said bearing shields and comprising a plurality of semiconductor rectifier elements; and carrier means for carrying and cooling said elements and comprising sheet metal strips each provided with a plurality of cutouts extending uniformly spaced from each other and transverse to the longitudinal direction of said strip and bent into a fan-shaped polygonal strip.

2. A structure as defined in claim 1, wherein each of said strips has between said cutouts a U-shaped cross section, having a base portion carrying said elements and a pair of flange portions extending substantially normal to said base portion.

3. A structure as defined in claim 2, wherein each of said strips is provided at each of said cutouts with a pair of wing portions extending substantially normal to said base portion to the same side as said flange portions, the wing portions at each cutout abutting against each other and being connected to each other.

4. A structure as defined in claim 2, wherein each of said cutouts forms a substantially circular opening in said base portion, and including fastening means extending through said circular opening for fastening said carrier means to said one bearing shield of the generator.

5. A structure as defined in claim 1, wherein said semiconductor rectifier elements are diodes.

6. A structure as defined in claim 1, wherein said bearing shields are provided with openings and including fan means adjacent the other of said bearing shield for drawing a stream of cooling air through said openings and through said generator, said carrier means being located in the path of said stream of cooling air.